June 30, 1931.                G. BERNERT                1,812,678
                              CONVEYER DUCT
                           Filed Sept. 19, 1927
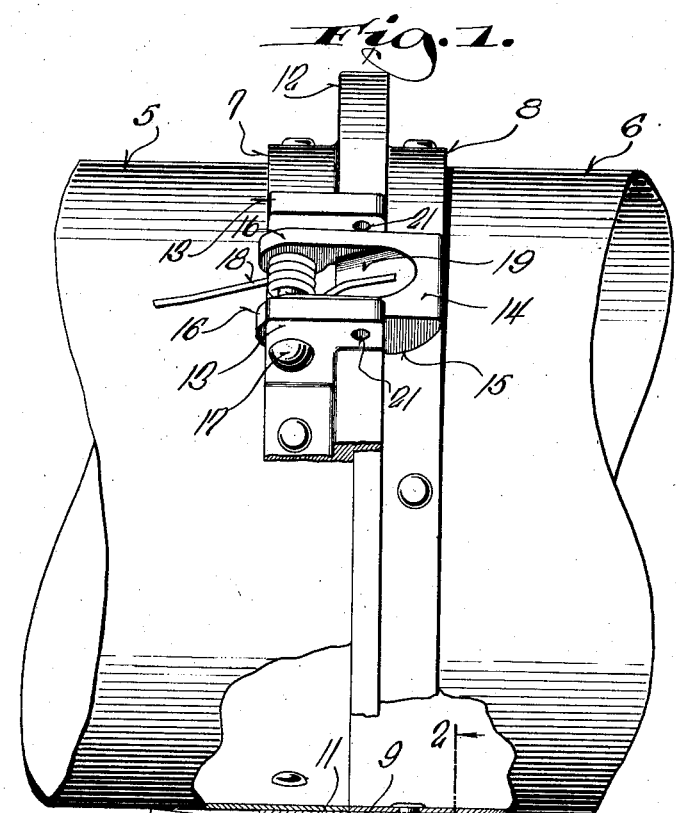
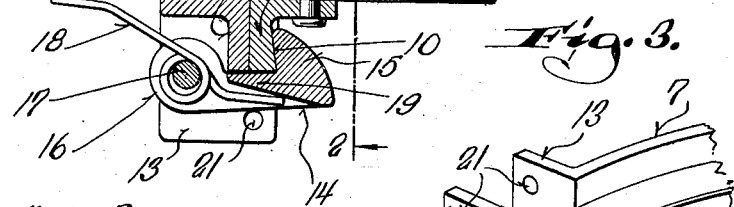
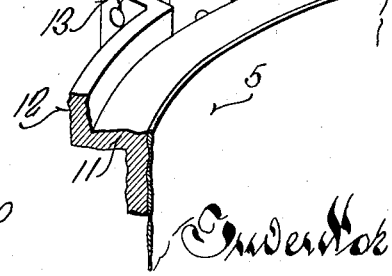
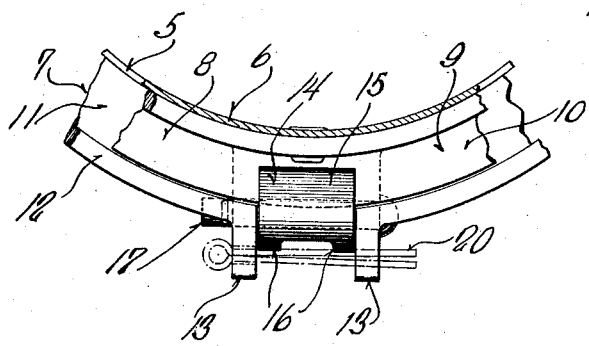
Inventor
George Bernert
By Ira Milton Jones.

Patented June 30, 1931

1,812,678

UNITED STATES PATENT OFFICE

GEORGE BERNERT, OF NORTH MILWAUKEE, WISCONSIN

CONVEYER DUCT

Application filed September 19, 1927. Serial No. 220,461.

This invention relates to new and useful improvements in conveyer ducts and refers more particularly to means for facilitating the connection of sections of ducts used with pneumatic conveyer apparatus.

In pneumatic conveyer apparatus, especially that type employed in the conveying of grain and other material, the conveyer duct is formed in sections which have heretofore been connected by bolted flanges. This manner of connecting the conveyer duct sections has proven objectionable as undue labor is required to install the conveyer or shift the conveyer duct when necessary and this invention contemplates as an object the provision of improved means whereby the sections of a conveyer duct may be instantly connected and at the same time be rigidly secured against accidental detachment.

Another object of this invention resides in the provision of an improved manner of connecting the sections of a conveying duct in which a spring urged member is carried by the end of one section for engagement with means carried by the adjacent end of the next section to readily detachably secure the sections together.

Another object of this invention resides in the provision of means for connecting two sections of a conveyer duct in which collar members are secured to the adjacent abutting ends of the duct sections and one of the collar members being provided with latch means engageable behind the other collar member.

A further object of this invention resides in the provision of latch means for connecting the adjacent abutting ends of two conveyer duct sections in which the latch is positioned between a pair of outwardly extended lugs and in which the latch acts substantially as a continuation of the collar to which it is pivoted to prevent leakage of air therepast.

A further object of this invention resides in the provision of improved means for connecting the sections of a conveyer air duct which prevents the accidental disconnection of the sections when subjected to undue vibration or rough handling.

And a still further object of this invention resides in the provision of an improved device of the character described which is extremely simple in construction and very reliable and durable in use.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a side view of the adjacent or abutting ends of two sections of a conveyer air duct equipped with my invention, parts thereof being broken away and in section to more clearly illustrate structural details;

Figure 2 is a cross sectional view taken through Figure 1 on the plane of the line 2—2; and, Figure 3 is a fragmentary detailed view illustrating the construction of the collar member from which the latch carrying lugs are extended.

Referring now more particularly to the accompanying drawings in which like numerals designate like parts throughout the several views, 5 and 6 designate adjacent abutting sections of a conveyer duct such as commonly employed in connection with the pneumatic type illustrated in Letters Patent No. 1,420,015 issued me June 20, 1922. Interlocking sleeves or collars 7 and 8 are fitted to the respective ends of the duct sections 5 and 6. The collar 8 is provided with an outwardly extended annular flange 9 whose outer or front face is substantially flush with the adjacent end of the duct section 6 and whose inner face is dished back at an angle, as at 10, for a purpose to be later described.

The collar 7 is likewise provided with an annular outwardly extended flange 11 which carries at its outer periphery an annular extension 12 adapted to telescopically receive or encircle the outer periphery of the flange 9.

At intervals about the periphery of the collar member 7 and preferably at three points, is a pair of outwardly extended lugs or ears 13, the annular extension 12 being cut away between the lugs 13 (see Figure 3) to accommodate a latch member 14 having a hook 15 which engages the angular face of the flange 9 to secure the sections together. Each latch member 14 has a pair of spaced arms 16 extended therefrom, which are apertured in alignment with apertures in the lugs 13, a stud 17 being passed through the apertures to pivotally mount the latch member. A coil spring 18 is coiled about the stud and is arranged to normally urge the latch to its locking position. The width of the latch member 14 is substantially the same as the distance between the lugs 13 so that when the sections are locked together and the latch is in its fully locked position, the wall 19 thereof forms substantially a continuation of the annular extension 12 and prevents all leakage of air therepast.

If desired, a cotter pin or other means 20, (see Figure 2,) may be passed through aligned apertures 21 in the outer portions of the lugs 13 to positively lock the latch member in its closed position and prevent accidental disengagement thereof.

What I claim as my invention is:

1. In a device of the character described, the combination with two longitudinally aligned conveyer duct sections having relatively thin walls, of means for readily detachably connecting the sections with their ends abutting and their inner walls substantially continuous, comprising a collar member carried by one duct section with its end substantially flush with the end thereof, a second collar member secured to the second duct section and having a part providing a seat in alignment with the end of the flange of the first collar member and having an annular flange overlying the joint between said flange end and said seat, and a latch member carried by one duct section and spring pressed to engage behind the collar of the other duct section at any point about its periphery.

2. A coupling for a pair of longitudinally aligned conveyer duct sections having relatively thin walls and arranged with their adjacent ends abutting and their walls forming continuations of each other, comprising a collar member fixed to one duct section, said collar member being substantially L shape in cross section and having the outer face of its lateral flange flush with the end of the duct section to which it is fixed, a second collar member fixed to the adjacent end of the other duct section and being similarly formed with its outer face flush with the end thereof, an annular flange extended longitudinally from one collar member to receive the lateral flange of the other collar member, said annular flange overlying the joint between the collar members to prevent disalignment of the duct sections, and latch members carried by one collar member and engageable behind the other at any point about its periphery to releasably secure the duct sections together.

In testimony whereof I hereunto affix my signature.

GEORGE BERNERT.